United States Patent [19]

Sharp, Jr.

[11] Patent Number: 5,029,376
[45] Date of Patent: Jul. 9, 1991

[54] HANDLING APPARATUS FOR TRANSFERRING SUPPORT SHAFTS TO REPLACEMENT PAPER ROLLS

[76] Inventor: Kenneth J. Sharp, Jr., 2725 SW. 216th, Aloha, Oreg. 97006

[21] Appl. No.: 519,829

[22] Filed: May 7, 1990

[51] Int. Cl.$^5$ ............................................. B23P 19/04
[52] U.S. Cl. ...................................................... 29/234
[58] Field of Search ................. 29/234, 235; 242/81, 242/68; 254/8 R, 124; 414/589

[56] References Cited

U.S. PATENT DOCUMENTS

| 2,630,624 | 3/1953 | Kirchner | 29/234 |
| 4,384,395 | 5/1983 | Gietman et al. | 29/234 |

FOREIGN PATENT DOCUMENTS

850589  9/1952  Fed. Rep. of Germany ........ 29/234

Primary Examiner—Robert C. Watson
Attorney, Agent, or Firm—Robert L. Harrington

[57] ABSTRACT

An apparatus for the handling of shafts, particularly in the printing industry. A carriage will receive an assembly of a core of a paper roll with a shaft installed therein, at a receiving station. The carriage is moveable to a second position where the core is removed from the shaft by a transfer mechanism. A shaft retaining device will retain the shaft on the carriage during core removal. After the core has been removed, the same transfer mechanism will transfer the shaft into a core of a new roll positioned in the receiving station.

9 Claims, 5 Drawing Sheets

HANDLING APPARATUS FOR TRANSFERRING SUPPORT SHAFTS TO REPLACEMENT PAPER ROLLS

BACKGROUND INFORMATION

1. Field of the Invention:

This invention relates to paper roll handling apparatus used in a commercial printing operation and in particular it relates to an apparatus for transferring support shafts from the cores of used-up paper rolls to replacement paper rolls.

2. Background of the Invention:

Paper utilized in commercial printing processes for printing, e.g. computer paper forms is supplied in large heavy rolls, e.g. of several thousand pounds. The rolls have a center core into which expandable shafts are insertable. The shafts facilitate the handling, moving and transferring of the paper rolls into the paper feed mechanism of a printing press.

The shafts that are utilized are of the expandable type. The shafts are inserted into a center core of the paper roll and are expanded, generally by the application of air pressure. The shafts have fingers or lobes that are extendable when air pressure is applied to engage the internal diameter of the roll core. The shafts extend beyond the ends of the roll. A hoist engages the ends of the shaft protruding from the ends of the roll to transport the roll to the in-feed section of the printing press. The ends of the shaft are supported in journals at the in-feed section of the press. When the paper on the roll has been depleted, that is fed into the printing press, the assembly of the shaft and the core remaining is transferred by the hoist out of the in-feed section of the press.

Until now, the assembly of the shaft and remaining core was manually removed from the hoist. The assembly was generally carried to a support fixture where the applied air pressure was released and the core of the paper roll was manually removed from the shaft.

One of the problems encountered was the weight of the assembly (i.e., the shaft and attached core). It weighs in the vicinity of 110 to 120 pounds. It was found that injuries occurred from the manual handling of the shaft and core.

Another problem encountered was the removal of the core from the shaft. In many instances, the fingers or lobes of the shaft would have dug into the core material. The core material of the roll is of paper construction (e.g. cardboard) and the extended fingers or lobes would penetrate the core material. This generally happened when a braking was applied to the roll and the shaft would tend to rotate relative to the roll and the fingers or lobes would "dig" in to the core. When this occurred, it was very difficult to remove the core from the shaft. In many cases, the core would have to be cut off.

When the core was finally removed from the shaft, the shaft was then manually inserted into a new roll. This required the manual lifting of the shaft off of the holding fixture, carrying the shaft to the location of a new roll and inserting the shaft into the core of the new roll.

BRIEF SUMMARY OF THE INVENTION

In a typical reloading operation, an overhead crane lifts the shaft and core from its mounting on the printing machine and lowers it to the floor immediately behind the machine. The shaft and core are removed and the core is taken off as previously explained. A new paper roll is positioned behind the machine, the shaft is inserted into the new paper roll core, and the overhead crane raises the shaft and paper roll into position.

In the present invention, a movable carriage is moved into position behind the machine and the expended core and shaft is lowered onto the carriage. The carriage is equipped with a core remover mechanism which mechanically removes the core from the carriage. The carriage is moved to permit placement of a new roll behind the printing machine. The movement of the carriage and placement of the new roll is coordinated to line up the shaft on the carriage with the core of the new roll. A mechanism on the carriage then pushes the shaft off the carriage and into the new roll core.

In the preferred embodiment the carriage is mounted to a pivotable arm mounted to a fixed base, the arm being operable to pivot the carriage from a first position where it receives the expended core and shaft and a second position where it is adjacent the to-be-mounted roll position and lined up for inserting the shaft into the new roll core. All of the previous manual operations are accordingly accomplished mechanically and expeditiously. A more detailed description of this preferred embodiment will be found in the following section.

DESCRIPTION OF THE PREFERRED EMBODIMENT

Figure 1:
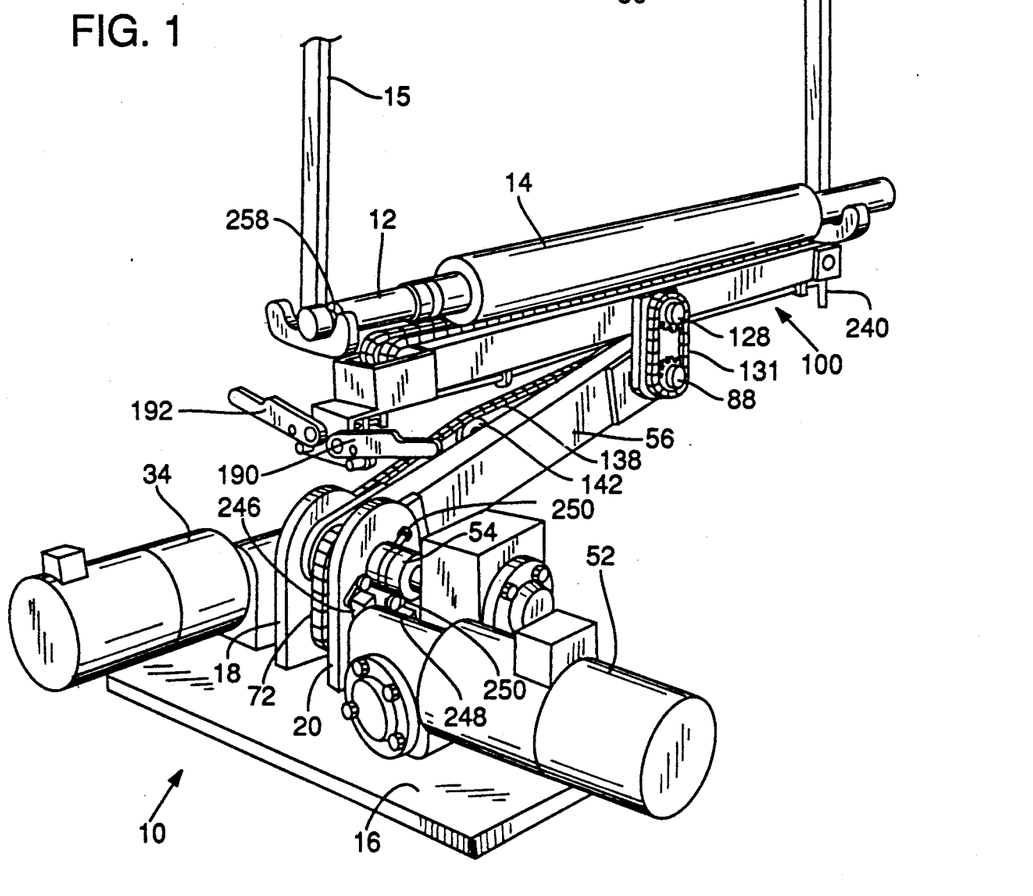
FIG. 1 is an isometric view of a shaft handling and transfer apparatus receiving a shaft and core at a receiving station.

Refer now to FIG. 1 of the drawings. A shaft handling apparatus 10 is shown receiving a shaft 12 from a hoist 15. Attached to the shaft 12 is a center core 14 of an expended paper roll.

Figure 2:
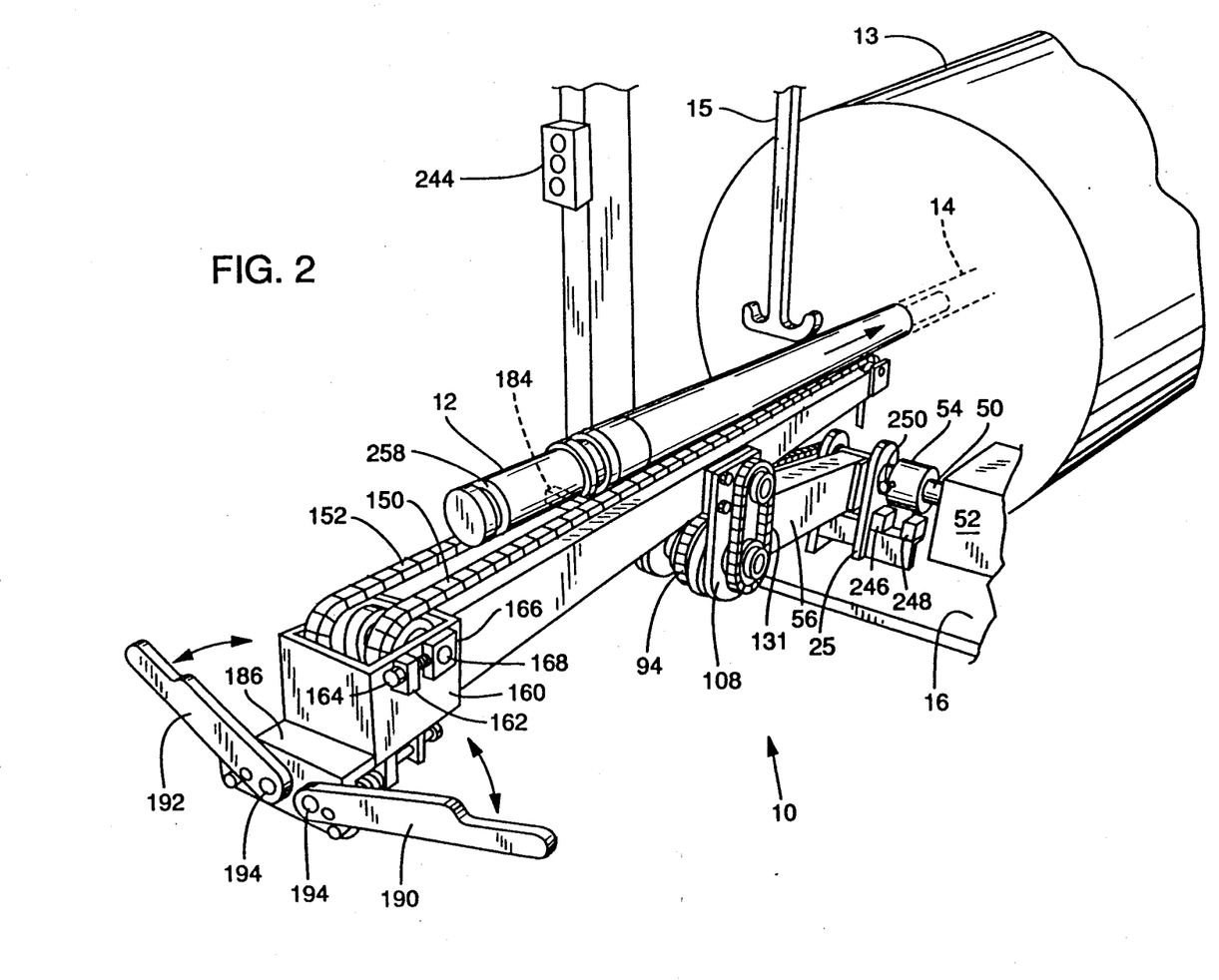
FIG. 2 is view of the shaft handling and transfer apparatus transferring the shaft into a paper roll at the transfer station.
Figure 3:
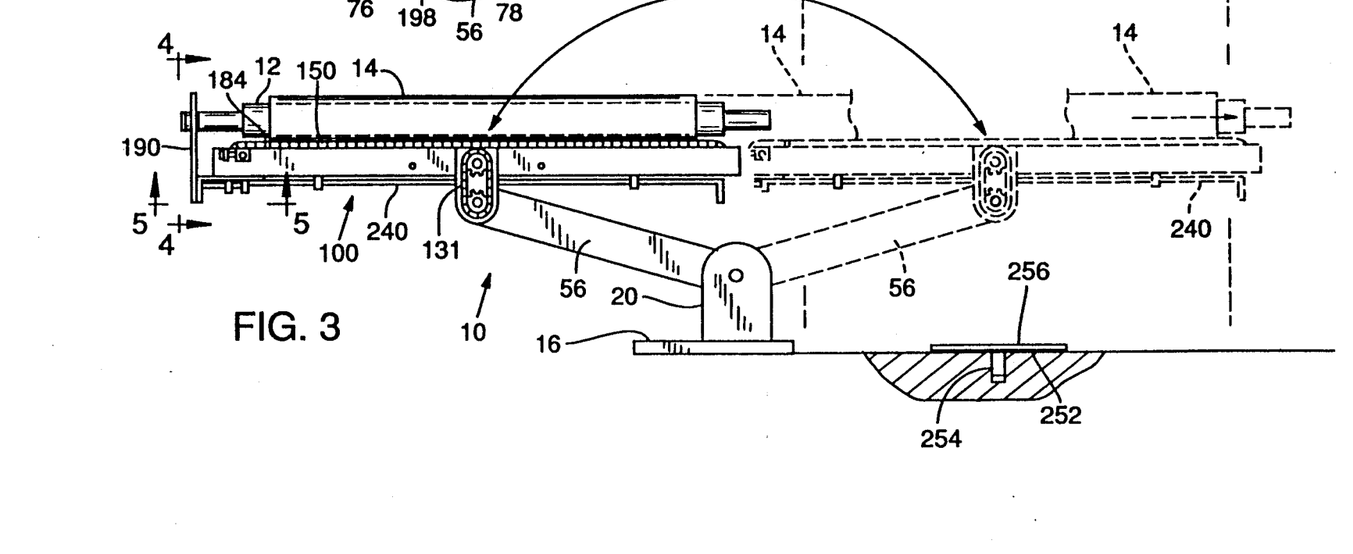
FIG. 3 is a side view of the apparatus of FIGS. 1 and 2 illustrating its two positions, the motor mechanism being shown schematically.

The carriage 100 (which will be described later) of the apparatus 10 is infinitely positionable between two positions or stations; a first position (a receiving station) and a second position (a transfer station). FIG. 1 illustrates the carriage positioned in the receiving station and FIG. 2 illustrates the carriage positioned in the transfer station. Both stations are illustrated in FIG. 3. The carriage is positioned in the receiving station to receive a shaft and core from the hoist 15. The carriage is positioned in the transfer station when transferring the shaft into a core 14 of a new paper roll 13.

As shown in FIG. 1, the apparatus 10 has a mounting base 16. The mounting base is fixedly secured to a mounting surface such as a floor as by bolting. Rigidly mounted on the base are two vertical support struts 18 and 20. As shown, the struts 18 and 20 extend vertically upward parallel to each other and are spaced at a distance from each other.

Figure 7:
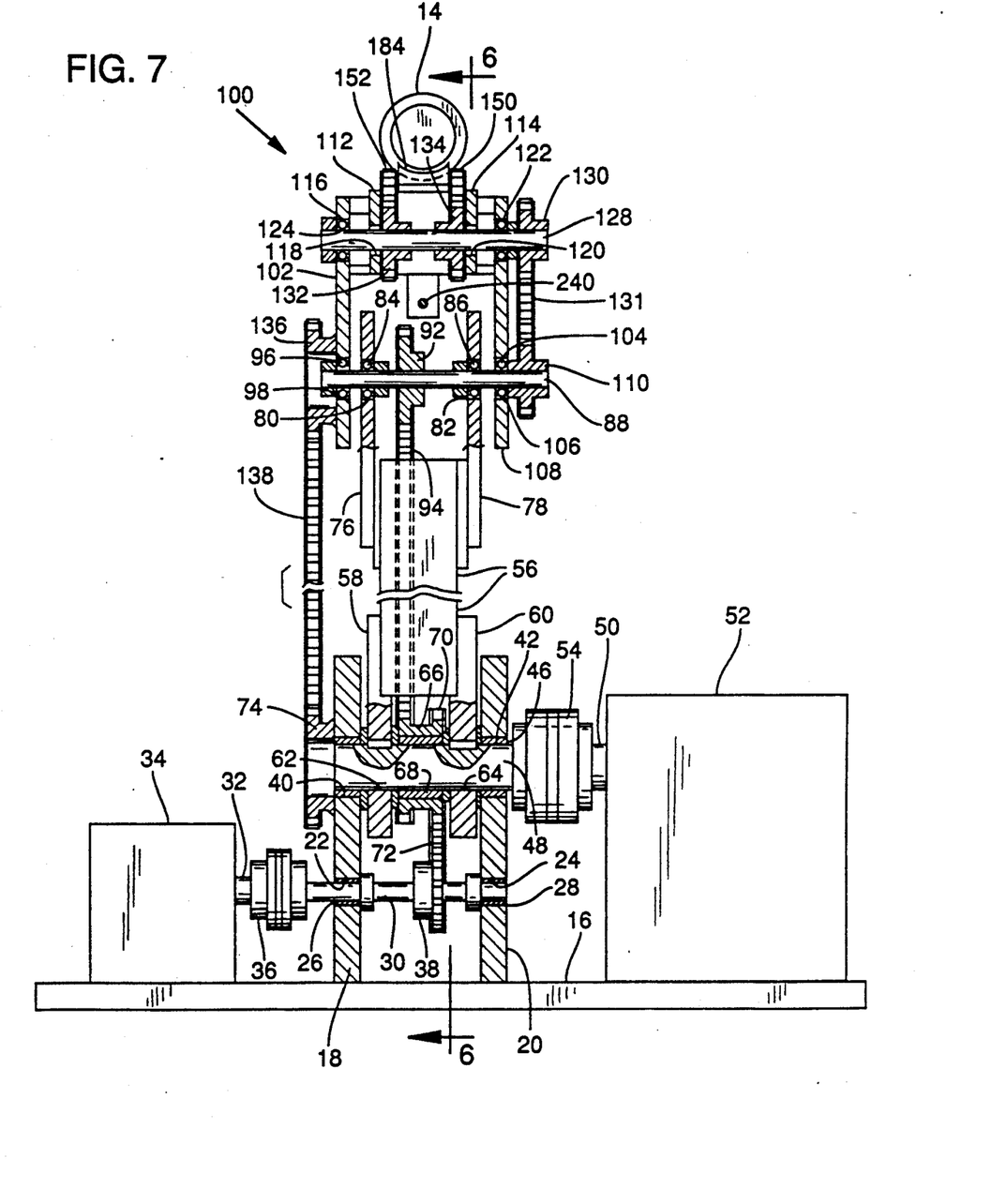
FIG. 7 is a sectional view of the carriage and support structure as taken on view lines 7—7 of FIG. 6 showing the drive train for the roller carrier chains and the pivot mechanism for the support beam.

Refer now to FIG. 7 which is a sectional view and details the construction of apparatus 10 and provides more detail on the struts 18 and 20 and related structure. As shown, the struts 18 and 20 extend from the base in a parallel spaced arrangement. The struts 18 and 20 are preferably fixedly attached to the base 16 as by welding.

Strut 18 has a bore 22 in its lower portion that is coaxially aligned with a bore 24 in the strut 20. A bearing 26 is installed in bore 22 and a bearing 28 is installed in bore 24. A drive shaft 30 is rotatably mounted in the bearings 26 and 28. As shown, an end of the shaft 30 extends beyond the edge of the strut 18. The end of the shaft 30 is coupled to an output shaft 32 of a motor and gearbox assembly 34 by a coupling 36. The motor and gearbox assembly 34 is removably attached to the base 16 as by bolting.

Fixedly mounted on the shaft 30, as by a drive key and keyway, between the struts 18 and 20 is a roller chain drive sprocket 38. Strut 18 has a bore 40 in its upper portion that is coaxially aligned with a bore 42 in strut 20. A bearing 44 is installed in the bore 40 and a bearing 46 is installed in the bore 42. A shaft 48 is rotatably mounted in the bearings 44 and 46 with an end of the shaft 48 extending beyond the edge of the strut 20 as shown in the figure. The end of the shaft 48 extending beyond the edge of the strut 20 is coupled to an output shaft 50 of a motor and gearbox assembly 52 by a coupling 54. The motor and gearbox assembly 52 is removably attached to the base 16 as by bolting.

An electrical control station 244 is shown in FIG. 2. The control station has electrical switches to control the operation of the motor and gearbox assembly 34 and the motor and gearbox assembly 52. The motor and gearbox assembly 52 is further controlled by limit switches 246 and 248 mounted near the output shaft 50 (FIG. 1). A stud 250 extending from the coupling 54 will operate the limit switch 246 to stop the pivotal motion of the beam 56 when the carriage reaches the transfer station and another stud 250 extending from the coupling 54 will operate the limit switch 248 to stop the pivotal motion of the beam 56 when the carriage reaches the receiving station. The motor of the assembly 52 is a reversing motor.

A support beam 56 as shown in FIG. 7, is fixedly mounted on the shaft 48. The support beam 56 is preferably constructed of rectangular box steel and has, extending from one of its ends, depending support members 58 and 60 fixedly attached, as by welding. Support member 58 has a bore 62 that is coaxially aligned with a bore 64 in the support member 60. The shaft 48 is fitted in the bores 62 and 64 and the shaft 48 is keyed to the members 58 and 60 in a conventional manner so that the shaft 48 and the members 58 and 60 will not rotate with respect to each other. The support beam 56, fixedly attached to the shaft 48 by the support members 58 and 60, is pivotally mounted to the struts 18 and 20 and therefore pivotally mounted in reference to the base 16.

A double sprocket 66 is rotatably mounted on the shaft 48 on a bearing 68. The double sprocket 66 fits on the shaft 48 between the support members 58 and 60. One of the sprockets 70 of the double sprocket 66 is aligned with the sprocket 38 on shaft 30. An endless roller chain 72 is fitted on the sprocket combination 70 and 38.

A roller chain sprocket 74 is rigidly attached, as by welding, to the outer surface of the strut 18 with the axis of the sprocket 74 coaxially aligned with the bore 40 in the strut 18. The sprocket 74 is no rotatable with respect to the strut 18.

Affixed to the opposite end of the support beam 56, as by welding, are depending support members 76 and 78. The support member 76 has a bore 80 that is coaxially aligned with a bore 82 in support member 78. A bearing 84 is fitted in bore 80 and a bearing 86 is fitted in bore 82. A shaft 88 is rotatably mounted in the bearings 84 and 86 with one end of the shaft extending beyond the member 76 and the opposite end of the shaft extending beyond the member 78. A sprocket 90 is mounted on the shaft 88, the sprocket 90 being between the members 76 and 78. The sprocket is keyed to the shaft 88 in a conventional manner so that the sprocket 90 will not rotate with respect to the shaft 88. The sprocket 92 is aligned with the sprocket 71 of the double sprocket 66. An endless roller chain 94 is fitted to the combination of sprockets 71 and 92.

The end of the shaft 88 that extends beyond the member 76 is rotatably mounted in a bearing 96 that is fitted in a bore 98 of a leg 102 of the carriage 100.

Figure 6:
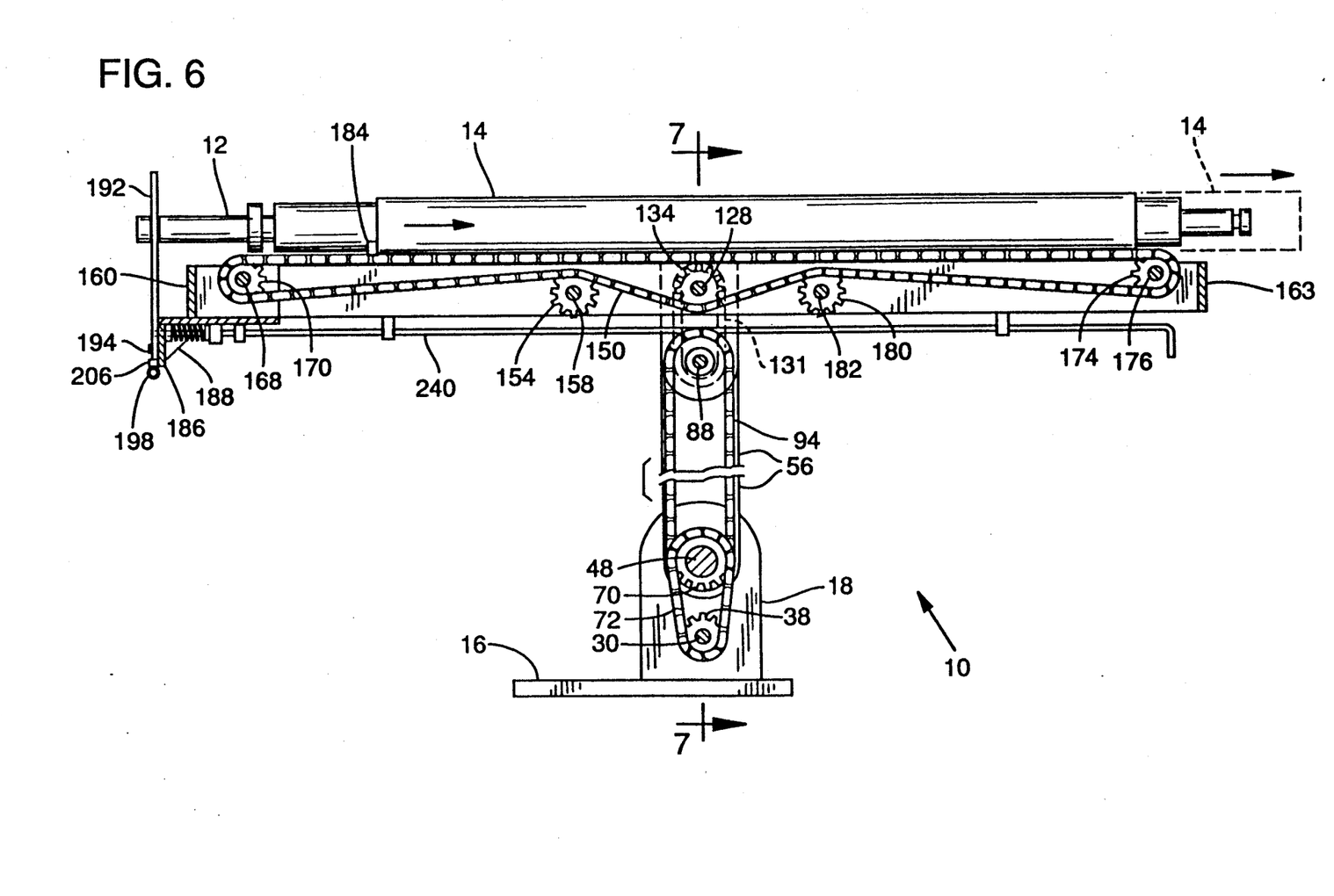
FIG. 6 is a sectional view of a carriage of the apparatus as taken on view lines 6—6 of FIG. 7 showing the drive train for the roller carrier chains.

The carriage 100 is mounted on the support beam 56 as will be detailed. The carriage 100 is preferably constructed of rectangular box steel and has depending legs 102 and 108 attached to the side rails 112 and 114 near its mid point. As seen in FIG. 6, structure 160 is provided at one end and a structure 163 is provided at the opposite end. A portion of the bottom surface is relieved, i.e., cut out, to provide clearance for the drive sprockets 132, 134 and the sprockets 154 and 180.

The end of the shaft 88 that extends beyond the member 78 is rotatably mounted in a bearing 104 that is fitted in a bore 106 of a leg 108 of the carriage 100. As shown in FIG. 7, the shaft extends beyond the leg 108 of the carriage 100 and a sprocket 110 is fitted on this end of the shaft 88. The sprocket 110 is keyed to the shaft in a conventional manner so that the sprocket will not rotate with respect to the shaft 88.

The upper portion of the legs 102 and 108 are attached to the side rails of the carriage 100, preferably by bolting, with leg 102 attached to side rail 112 and leg 108 attached to the side rail 114. The upper end of leg 102 that is attached to the side rail 112 (as viewed in FIG. 7) has a bore 116 that is coaxially aligned with a bore 118 in the side rail 112, a bore 120 in side rail 114, and a bore 122 in the upper end of leg 108. A bearing 124 is fitted in bore 116 of leg 102 and a bearing 126 is fitted in bore 122 of leg 108. A shaft 128 is rotatably installed in the bearings 124 and 126 with an end of the shaft 18 extending beyond the edge of leg 108. A sprocket 130 is fixedly attached, as by a key and keyway, to the end of the shaft 128 extending beyond leg 108. The sprocket 130 is aligned with the sprocket 110 mounted on shaft 88 and an endless roller chain 131 is fitted on the sprocket combination 130 and 110.

Fixedly mounted, as by key and keyway, on the shaft 128 between the side rails 112 and 114 are sprockets 132 and 134. Sprocket 132 is adjacent side rail 112 and sprocket 134 is adjacent side rail 114.

The carriage 100 having legs 102 and 108 rotatably bearing mounted by bearings 96 and 104 on the shaft 88 is thus pivotally mounted on the support beam 56.

A sprocket 136 is fixedly attached, as by welding, to the leg 102 of the carriage 100. The sprocket 136 is coaxially aligned with the shaft 88. The sprocket 136 is aligned with the sprocket 74 fitted to the strut 18. An endless roller chain 138 is fitted on the sprockets 136 and 74. The tension of the roller chain 138 is maintained by a chain tightener 140.

Figure 8:
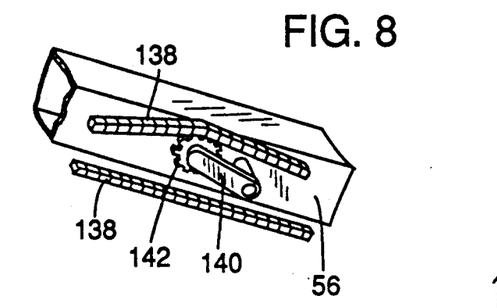
FIG. 8 is a partial view illustrating a chain tightener as used on the support structure of FIG. 7.

The chain tightener 140 is illustrated in FIG. 8 and is preferably of the self adjusting type. The chain tightener 140 has an idler sprocket 142 that is yieldably biased against the chain 138 thereby applying tension to the chain.

Refer now to FIG. 6 of the drawings. This figure shows the carriage 100 in section and details one of the two carrier chains. The construction detail of the other carrier chain is the same. The carrier chains 150 and 152 are in a parallel configuration. As shown in the figure, sprocket 134 mounted on shaft 128 engages an endless roller carrier chain 150, with the chain 150 traveling on the underside of the sprocket 134 (as viewed in the figure). To the left of sprocket 134 (again as viewed in the figure) is a sprocket 154. The sprocket 154 is rotatably mounted on a shaft 158 and is aligned with sprocket 134. The shaft is mounted in bores (not shown) in the side rails 112 and 114 of the carriage 100. As shown, the roller carrier chain 150 travels over the top of the sprocket 154.

A support structure 160 as illustrated in FIG. 2 is mounted on an end of the carriage 100 as by welding. The structure 160 is basically "U" shaped and is attached to the end of the carriage 100 as by welding. A fixed block 162 is affixed to a side of the structure 160. The fixed block 162 has a through bore into which a threaded stud 164 is inserted. The stud 164 extends to threadably engage a moveable block 166. Rotation of the stud 164 will then move the moveable block 166 in reference to the fixed block 162. A fixed block 162', a moveable block 166' and a stud 164' are provided on the opposite side of the structure 160. The moveable blocks 166 and 166' are bored to accept the ends of a shaft 168. The sides of the structure 160 are suitably relieved for movement of the shaft 168 mounted in the blocks 166 and 166'.

A sprocket 170 is rotatably mounted on the shaft 168 and is aligned with the sprockets 154 and 134. The chain 150 extends around the sprocket 170 and extends onto the upper surface 172 of the carriage 100 and engages a sprocket 174 at the opposite end of the carriage 100. A support structure 163, similar to the support structure 160 is mounted on the end of the carriage as by welding. The sprocket 174 is rotatably mounted on a shaft 176 that is installed in bores (not shown) in the sides of the structure 163. The chain 150 extends around the sprocket 174 and extends to the sprocket 180 rotatably mounted on shaft 182 that is installed in bores (not shown) provided in the side rails 112 and 114. The chain 150 extends over the top (as viewed in FIG. 7) of the sprocket 180. The chain 150, being endless, continues and extends under the drive sprocket 134 as previously stated.

The moveable blocks 166 and 166' on the structure 160 provide a mechanism for applying tension to the roller carrier chains 150 and 152 installed on the carriage 100.

At least one drive dog 184 (shown in FIGS. 2 & 6) that is interconnected to the parallel carrier chains 150 and 152 is provided. One end of the dog 184 is connected to a link of the chain 150 and the other end of the dog 184 is connected to a link of the chain 152. The dog 184 will remove a core 14 of the paper roll from a shaft 12 and transport the shaft 12 into a new roll as will be later explained.

The carrier chains 150 and 152 are driven by the motor and gearbox assembly 34. As the output shaft 32 is rotated, the shaft 30 which is coupled to the shaft 32 is rotated. The sprocket 38 keyed to the shaft 30 is rotated which rotates the double sprocket 66 on shaft 48 by the endless chain 72. The sprocket 71 of the double sprocket 66 rotates the sprocket 92, shaft 88 and sprocket 110 by the action of the chain 94. The sprocket 110 in turn drives the sprocket 130 and the shaft 128 by the chain 131. The drive sprockets 132 and 134 on the shaft 128 engage the chains 152 and 150 to propel them.

The motor and gearbox assembly 52 having its output shaft 50 coupled to the shaft 48 will rotate the shaft 48 as the output shaft 50 is rotated. The shaft 48, keyed to the struts 58 and 60 of the beam 56, will thus pivot the beam 56 about its pivot axis (which is coincident with the axis of the shaft 48). As the beam is pivoted, the endless roller chain 138 fitted on the sprocket combination 74 and 136 acts as a parallel arm arrangement. As the beam 56 is pivoted, the sprocket 136 moves through an arc, and the sprocket in engagement with the chain 138 causes the sprocket to rotate about its axis. As the beam is pivoted, the carriage 100 is thus maintained in a parallel attitude with respect to the base 16. This is best seen in FIG. 3.

Figure 4:
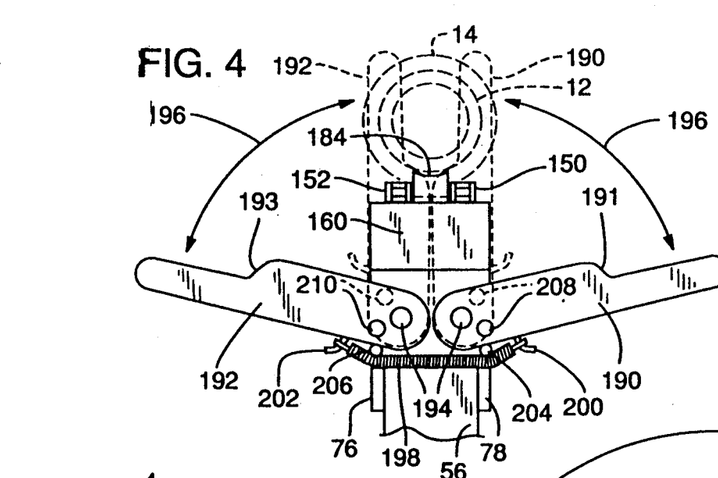
FIG. 4 is an end view as viewed on view lines 4—4 of FIG. 3 showing the shaft retaining arms.
Figure 5:
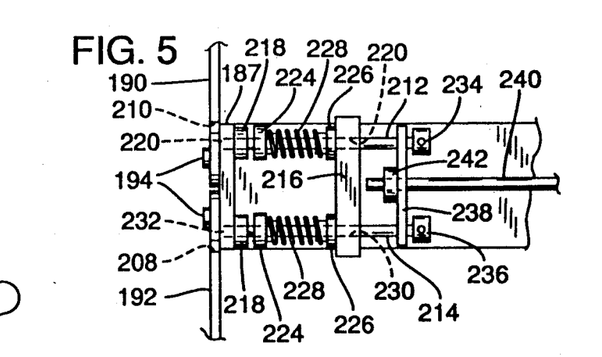
FIG. 5 is a view of the detent mechanism for the shaft retaining arms as viewed on view lines 5—5 of FIG. 3.

An "L" shaped bracket 186 is provided on the end of the carriage 100 and is fixedly attached to the "U" shaped structure 160 as shown in FIGS. 2 & 6 and is further illustrated in FIGS. 3, 4, & 5. A triangular gusset 188 is provided for added rigidity. FIG. 2 shows the shaft retaining arms 190 and 192 pivotally mounted on a leg 187 of the bracket 186. In this embodiment, the arms 190 and 192 are pivotally mounted on shouldered cap screws 194. The bracket 186 is drilled and tapped to accept the cap screws 194.

Refer now to FIG. 4 of the drawings. The arms 190 and 192 are shown in the open position. The arms 190 and 192 are pivotable on the cap screws 194 as indicated by the arrows 196 to a closed position as shown in "shadow". In the closed position, the arms 190 and 192 will engage a groove near an end of the shaft 12 as shown and as further illustrated in FIGS. 3 and 6.

It is preferable to have the arms 190 and 192 configured to the shape shown in FIG. 4. The diameter of the assembly of a shaft and core varies. The diameter depends on the quantity of paper that remains on the core. With the configuration of the arms 190 and 192, differing assembly diameters are accommodated. In addition the shoulder 191 on arm 190 and the shoulder 193 on arm 192 engaging the base of the groove in the shaft 12 prevent the shaft from lowering and contacting the moving carrier chains during the removal of the core.

The arms 190 and 192 are pivotally biased toward the open position by a tension spring 198. One end of the spring 198 is attached to a clip 200 on arm 190 and the opposite end of the spring 198 is attached to a clip 202 on arm 192. The spring extends under stop pins 204 and 206 that extend from the bracket 186. The pivotal movement of the arms 190 and 192 caused by the action of the spring 198 is limited by the stop pins 204 and 206 extending from the bracket 186. Stop pin 204 will limit the pivotal movement of the arm 190 and stop pin 206 will limit the pivotal movement of the arm 192, the pivotal movement being urged by the action of spring 198. Arm 190 has an aperture 208 that will receive retaining pin 212 (see FIG. 5) when the arm 190 is in the closed position and arm 192 has an aperture 210 that will receive retaining pin 214 when the arm 192 is in the closed position. The retaining pins 212 and 214 will retain the arms 190 and 192 in the closed position when the pin 212 enters the aperture 208 and pin 214 enters the aperture 210.

Refer now to FIG. 5 which shows the detail of the retaining pins 212, 214 and related structure. A mounting block 216 is mounted to the under side of the 186 bracket at a distance from the leg 187. A support bushing 218 is attached to the leg 187. The block 216 has a through bore 220 aligned with a through bore 222 that extends through the bushing 218 and leg 187. The retaining pin 212 fits slidably in the bores 220 and 222. Adjustably mounted on the retaining pin 212 between the mounting block 216 and the leg 187 is a spring collar 224. The collar 224 is adjustable along the pin 212 and is secured in position as by a set screw. Slidably mounted on the pin 212 adjacent the block 216 is a bushing 226. A compression spring 228 that encircles the pin 212 is mounted between the collar 224 and the bushing 226. The spring 228 acting against the collar 224 and the bushing 226 urges the pin 212 toward the arm 190 and when the arm 190 is moved to the closed position, the spring 228 will urge the pin 212 into the aperture 208 of the arm 190 and thereby retain the arm 190 in the closed position.

The retaining pin 214 is mounted in the same manner as pin 212. Another support bushing 218 is attached to the leg 187. The block 216 has a through bore 230 aligned with a through bore 232 that extends through the bushing 218 and leg 187. The retaining pin 214 will fit slidably in the bores 230 and 232. Adjustably mounted on the retaining pin 214 between the mounting block 216 and the leg 187 is another spring collar 224. The collar 224 is adjustable along the pin 214 and is secured in position as by a set screw. Slidably mounted on the pin 214 adjacent the block 216 is another bushing 226. Another compression spring 228 that encircles the pin 214 is mounted between the collar 224 and the bushing 226. The spring 228 acting against the collar 224 and the bushing 226 urges the pin 214 toward the arm 192 and when the arm 192 is moved to the closed position, the spring 228 will urge the pin 214 into the aperture 210 of the arm 192 and thereby retain the arm 192 in the closed position.

The distance between the collars 224 mounted on the pins 212 and 214 and the bushings 218 attached to the leg 187 must be sufficient to permit the pin 212 to enter the aperture 208 in arm 190 and the pin 214 to enter the aperture 210 in arm 192 when the arms are pivoted to the closed position.

As shown in the figure, the pins 212 and 214 extend beyond the block 216. Pin 212 has a head 234 and pin 214 has a head 236. A bar 238 having through bores in each of its ends (not shown), is slidably mounted on the pins with the bar positioned between the heads of the pins and the block 216. The center of the bar 238 has a rod 240 slidably installed in a bore (not shown). A stop collar 242 is affixed to the end of the rod. As shown in FIG. 3, the rod 240 extends the length of the carriage 100. The rod 240 is utilized to extract the pins 212 and 214 from the apertures in the arms 190 and 192. As the rod 240 is moved in a direction away from the leg 187 (and thus against the biasing force of the springs 228), the stop collar 242 engages the bar 238, and the bar is moved against the heads 234 and 236 of the pins 212 and 214. Continued movement of the rod 240 then moves the pins 212 and 214 out of the apertures 208 and 210 in the arms 190 and 192. The spring 198 then pivots the arm 190 and 192 to the open position.

A turntable 252 is provided at the receiving station and is shown in FIG. 3. The turntable 252 is a flat circular disc that is rotatably mounted on a support surface such as a floor (represented by line 256) by an attached shaft 254 that extends into the surface. The turntable will permit the swiveling of a roll 13 (shown in "shadow") to align the axis of the core 14 with the axis of the shaft 12 on the carriage 100.

Refer now to FIG. 1 of the drawings. It shows the apparatus 10 with the carriage 100 positioned in the receiving station, receiving an assembly of an expandable shaft 12 and a paper roll core 14. The shaft 12 with the core 14 is being lowered onto the carriage 100 of the apparatus 10 by a hoist 15. The hoist is continued in a downward direction until the hoist is clear of the shaft 12 and the assembly is received on the carriage 100.

The shaft 12 is of the type that has expanding fingers that extend to grip the internal diameter of the core 14 when the shaft is initially inserted into the core. After the hoist 15 has cleared the ends of the shaft 12 and moved to another position, an operator will collapse the expanded shaft 12 so as to release its grip on the core 14. The shaft retaining arms 190 and 192 are pivoted to the closed position, with the arms engaging a peripheral groove 258 in the shaft 12. The arms will be retained in the closed position by the pins 212 and 214 engaging the apertures 208 and 210 of the arms 190 and 192. The arms 190 and 192 engaging the groove 258 of the shaft 12 will retain the shaft in position on the carriage 100.

The motor and gearbox assembly 52 is engaged to reposition the carriage 100 from the receiving station to the transfer station. Note that the carriage may be repositioned to the transfer station after the removal of the core. The working space available is generally the controlling factor.

The motor and gearbox assembly 34 is engaged to drive the carrier chains 150 and 152 on the carriage 100. As the carrier chains 150 and 152 move, the drive dog 184 will engage an edge of the core 14 and continued movement of the dog 184 will move the core along the carriage 100 and thus be removed from the shaft 12 which is retained in position on the carriage 100. When the core is completely removed from the shaft 12, the motor and gearbox assembly 34 is stopped, and the retaining pins 212 and 214 are retracted out of the apertures 208 and 210 in the arms 190 and 192. The spring 198 will pivot the arms 190 and 192 to the open position permitting the shaft 12 to rest on the carrier chains 150 and 152 of the carriage 100.

A new roll 13 is brought into the receiving station and is positioned on the turntable 252. If required, the assembly 52 is utilized to elevate or lower the carriage 100 to align the shaft 12 positioned on the carriage with the core 14 of the roll 13 and the roll 13 is swivelled on the turntable to align the longitudinal axis of the core 14 of the roll 13 with the longitudinal axis of the shaft 12 on the carriage 100.

The motor and gearbox assembly 34 is engaged to drive the carrier chains 150 and 152 on the carriage 100.

As the carrier chains 150 and 152 move, the drive dog 184 will engage an edge of the shaft 12 to move the shaft along the carriage and transfer (i.e., insert) the shaft 12 into the core 14 of the paper roll 13. The shaft is expanded to engage the interior diameter of the core.

The preferred embodiment referred to shafts with attached cores. The apparatus is equally suited to handling of shafts that do not have cores attached.

It will be apparent to those skilled in the art that modifications and variation may be made without deviating from the true spirit of the invention. The invention is therefore not to be limited to the description and drawings, but is to be determined by the appended claims.

What is claimed is:

1. An apparatus for replacing an expended paper roll having a core and a separable internal shaft, with a new paper roll having a core in which the shaft is to be inserted, comprising;
    a carriage for receiving the core and shaft of an expended paper roll from a paper roll handling mechanism as a paper roll replacement station, releasable gripping means on the carriage for releasably gripping and holding the shaft on said carriage, and stripping means for engaging and moving the core relative to the carriage and shaft with the shaft held by the gripping means to thereby separate the shaft and core, and transfer means engaging and moving the shaft along the carriage with the gripping means released from the shaft,
    a carriage positioning means for positioning the carriage between first and second positions relative to the paper roll replacement station, said first position locating the carriage at the station for receiving an expended paper roll core and shaft, and a second position relative to said replacement station enabling the transfer means to transfer the shaft into a new paper roll core located at the replacement station.

2. An apparatus as defined in claim 1 wherein the shaft has a peripheral groove adjacent one end that is projected out of the core, said gripping means having pivotal arms that pivot into and out of the groove for releasably securing the shaft to the carriage.

3. An apparatus as defined in claim 1 wherein said stripping means includes a drive dog carried by a carrier chain entrained along the carriage length and controllable motor means for driving the carrier chain whereby the drive dog engages the core and forces movement of the core along the carriage length.

4. An apparatus as defined in claim 3 wherein the drive dog carried by the carrier chain functions as the shaft transfer means whereby upon removal of the core, the drive dog is positioned to engage and move the shaft into the new paper roll core.

5. An apparatus as defined in claim 1 including a paper roll positioning means at said station for cooperatively positioning the paper roll relative to the carriage for aligning the shaft on the carriage for insertion of the shaft into the core of the new paper roll.

6. An apparatus as defined in claim 1 wherein the carriage positioning means comprises;
    a support beam pivotally mounted at one end to a support surface adjacent the roll replacement station, said support beam having its opposite end connected to the carriage whereby pivoting of the support beam in a vertical arc from side to side positions the carriage between the first and second stations, and manually controlled motor means for pivoting the arm and thereby the carriage between said first and second stations.

7. An apparatus for removing a core of an expended paper roll from an internal shaft which is to be transferred to a core of a new paper roll comprising;
    a carriage defining a cradle for receiving the expended paper roll core and shaft, gripping means for securing the shaft relative to the carriage, said gripping means including a peripheral groove adjacent one end of the shaft that is projected out of the core, said gripping means having pivotal arms that pivot into and out of the groove for releasably securing the shaft to the carriage, and movable stripping means movable relative to the carriage, said stripping means including core engaging means for engaging the core and as a result of the shaft held relative to the carriage and the stripping means moved relative to the carriage, stripping the core from the shaft.

8. An apparatus as defined in claim 7 wherein said stripping means includes a drive dog carried by a carrier chain entrained along the carriage length and controllable motor means for driving the carrier chain whereby the drive dog engages the core and forces movement of the core along the carriage length.

9. An apparatus as defined in claim 8 wherein the drive dog carried by the carrier chain functions as the shaft transfer means whereby upon removal of the core, the drive dog is positioned to engage and move the shaft into the new paper roll core.

* * * * *